Patented Apr. 4, 1950

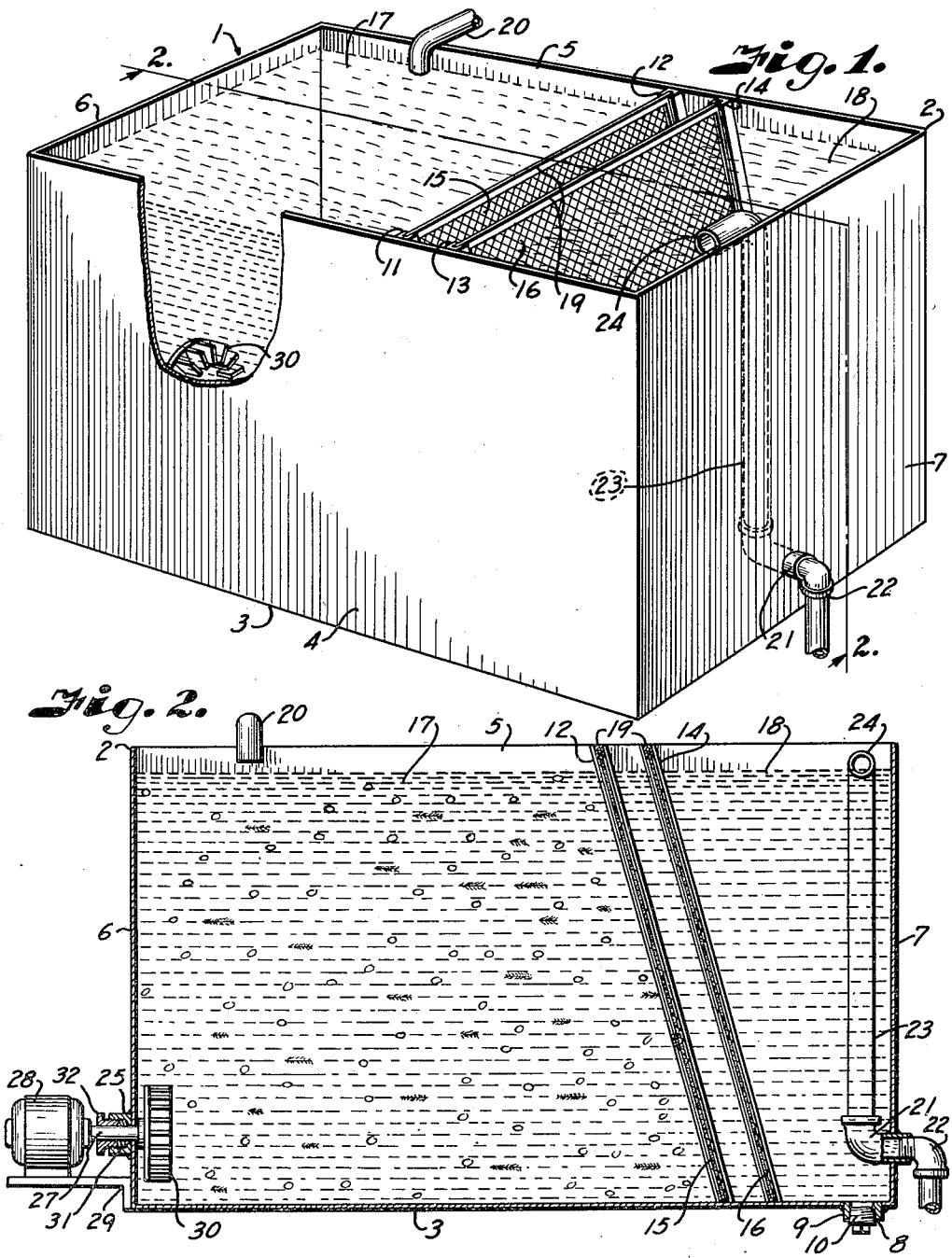

2,502,726

UNITED STATES PATENT OFFICE 2,502,726

DISSOLVING APPARATUS

William A. Horton, Larned, Kans., assignor of one-half to Larned Poultry & Egg Company, Newton, Kans., a partnership Application December 11, 1946, Serial No. 715,438

1 Claim. (Cl. 23—267)

This invention relates to poultry and animal droppings disposal apparatus and more particularly to apparatus for dissolving portions of said droppings in water and separating the insoluble portions therefrom.

Persons engaged in poultry and egg business have gone to a great deal of trouble and expense in disposing of poultry droppings. In some areas when the pans under the poultry cages are cleaned, which is every day, the droppings must be placed in containers and hauled to rural areas and buried. Many sewer districts have restrictions on the placing of the droppings in the sewer because the feathers usually contained in the droppings tend to clog the sewer.

The principal objects of the present invention are therefore to provide apparatus for dissolving poultry droppings in water; to provide agitation in the water for facilitating the dissolving of the soluble portions of the droppings; to provide for separating insoluble matter from the droppings; to provide removable screens for separating insoluble matter from the droppings; to provide for dissolving the soluble matter of the droppings in water and disposing of the solution in a sewer or the like; and to provide dropping disposal apparatus simple in structure, efficient in operation and easily cleaned and maintained in a relatively sanitary condition.

In accomplishing these and other objects of the present invention I have provided improved details of structure, the preferred form of which is illustrated in the accompanying drawings, wherein:

Fig. 1 is a perspective view of a poultry droppings disposal apparatus embodying the present invention.

Fig. 2 is a vertical longitudinal sectional view through the apparatus on the line 2—2, Fig. 1.

Referring more in detail to the drawings:

1 designates a poultry and animal droppings disposal apparatus consisting of a tank 2 having a bottom 3, side walls 4 and 5 and end walls 6 and 7. The tank is preferably open at the top and adapted to contain water which is supplied to the tank as later described. A drain 8 is provided in the bottom of the tank adjacent the end wall 7 and consists of a boss 9 having an opening therein normally closed by a threaded plug 10.

Oppositely disposed channel members 11 and 12, and 13 and 14 are preferably mounted on the inner surface of the walls 4 and 5. The lower ends of said channels are spaced from the end wall 7 of the tank and sloped upwardly and away from said wall 7 to provide guides for mounting screens 15 and 16 separating the tank into inlet and outlet chambers 17 and 18 respectively. The screens 15 and 16 have their edges enclosed in frames 19 and are preferably of such mesh as to prevent passage of feathers and other insoluble portions of the droppings therethrough.

Water is preferably supplied to the inlet section 17 of the apparatus by means of a duct 20 having suitable connection with a water supply whereby a suitable flow of water may be supplied to the tank as desired. In order to maintain the level of the water substantially adjacent the top an overflow drain is arranged adjacent the end wall 7 consisting of a suitable pipe fitting 21 mounted in and extending through the wall 7 and adapted to be connected by means of suitable piping 22 and connections therefor with a sewer or other disposal means. The fitting 21 is preferably adapted to be connected to a vertically arranged pipe 23 extending upwardly in the tank adjacent the wall 7 and having a horizontal portion 24 at the upper end thereof arranged slightly below the upper edge of said tank walls whereby excess water in the tank may be drained therefrom and the water level maintained in said tank.

Centrally located in the end wall 6 and adjacent the bottom 3 is a boss 25 having an opening 26 therein to pass a shaft 27 of a motor 28 preferably mounted on a bracket 29 secured to the end wall 6. An impeller 30 is mounted in the tank on the inner end of the shaft 27, said impeller being of any suitable type for example a vane type capable of providing agitation in the tank 2. Mounted in the boss 25 surrounding the shaft 27 is packing 31 and a packing gland adapted to seal the opening around the shaft 27.

In using apparatus assembled and constructed as described, a supply of water is delivered through the duct 20 into the tank 2, said water flowing continuously during the operation of the device. Water is allowed to completely fill the tank to the level determined by the overflow connection 24. When the tank is full of water and flowing from the overflow, the apparatus is ready for use. The motor 28 is connected to a suitable source of electric current to energize same and rotate the impeller 30 for providing agitation of the water in said tank. The pans are then removed from under the poultry cages in the plant and scraped or otherwise cleaned and the droppings placed in the water at the inlet portion 17 of said tank. The agitation and the constant flow of water in the tank rapidly will dissolve all soluble portions of the droppings, which will flow through the screens 15 and 16 into the outlet portion of the tank and through the overflow connection 24 to a suitable disposal such as a sewer, all of the particles passing therethrough being soluble cannot cause damage to the sewer or the connections thereof. Feathers and other insoluble portions of the droppings will be stopped by the screens 15 and 16 and trapped thereby and due to the slope of the screens will tend to work to the bottom thereof so as not to interfere with additional flow through said screens. Any small particles capable of passing through the screens may flow with the water into the sewer or other disposal without clogging same, the continual flow of water assuring the flushing of said particles to the sewer.

After all of the pans are cleaned and the droppings in the tank 2 are suitably dissolved and disposed of in the sewer, the plug 10 may be removed from the boss 9 to permit the tank to be drained and cleaned. After draining the screens may be removed and cleaned of any feathers adhering thereto and any feathers or insoluble portions of the droppings collected on the bottom of the tank may be removed therefrom and disposed of in any suitable manner. It is to be noted that the feathers are thoroughly washed and cleaned and therefore provide no disposal problem. Also the feathers are only a small portion of the normal quantity of droppings that must be disposed. After all the feathers and other insoluble portions have been removed from the screens and tank the screens and tank may then be thoroughly cleaned and treated in any suitable manner to maintain same in a sanitary condition. The screens may then be inserted into the guide members 11 and 12 and 13 and 14 and the apparatus is then ready for use disposing of the next day's droppings.

It is believed obvious that I have provided a simple, efficient apparatus for disposing of poultry and animal droppings and facilitating the maintaining of a poultry installation in sanitary condition.

What I claim and desire to secure by Letters Patent is:

In a poultry and animal droppings disposal apparatus, a tank having bottom, side and end walls, spaced screens extending crosswise of said tank in inclined relation to the bottom thereof for dividing said tank into inlet and outlet compartments, said screens being inclined from the bottom toward the inlet compartment and extending from the bottom to the top of said tank, channel members mounted on the side walls and bottom of the tank and engaging the edges of the screens for supporting same in the tank to retain insoluble material of the droppings in the inlet compartment, an inlet pipe having connection with a source of water supply for flowing water into the inlet compartment, an outlet pipe having its receiving end opening into the outlet compartment in spaced relation to the bottom for discharge of liquid from the tank when the level thereof is above the outlet opening, an impeller in the inlet compartment, means in the end wall of the inlet compartment for rotatably mounting said impeller, and means exteriorly of the tank having driving connection with said impeller for rotating same for facilitating dissolving of poultry and animal droppings deposited in the water in the inlet compartment.

WILLIAM A. HORTON.

REFERENCES CITED

The following references are of record in the file of this patent:

UNITED STATES PATENTS

| Number | Name | Date |
|---|---|---|
| 306,981 | Wheting | Oct. 21, 1884 |
| 580,561 | Stephenson | Apr. 13, 1897 |
| 788,102 | Hening | Apr. 25, 1905 |
| 1,158,304 | Schaub | Oct. 26, 1915 |
| 1,705,009 | Fuqua | Mar. 12, 1929 |
| 1,736,890 | Sweeney | Nov. 26, 1929 |